Dec. 3, 1946.    N. LESTER    2,411,999
PRESSURE EXTRUSION MOLDING
Filed May 19, 1942    2 Sheets-Sheet 1

INVENTOR.
NATHAN LESTER
BY Oberlin, Limbach & Day
ATTORNEYS

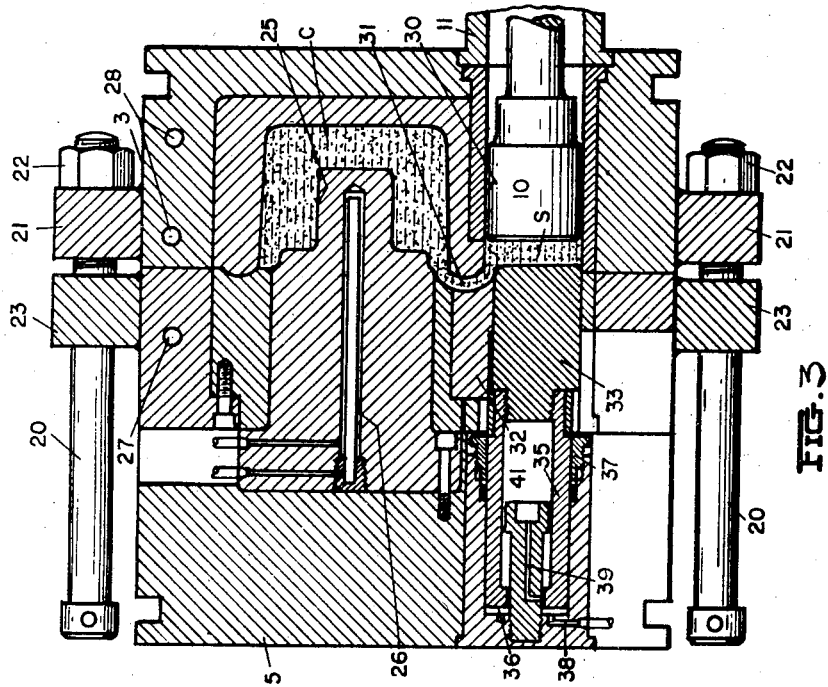
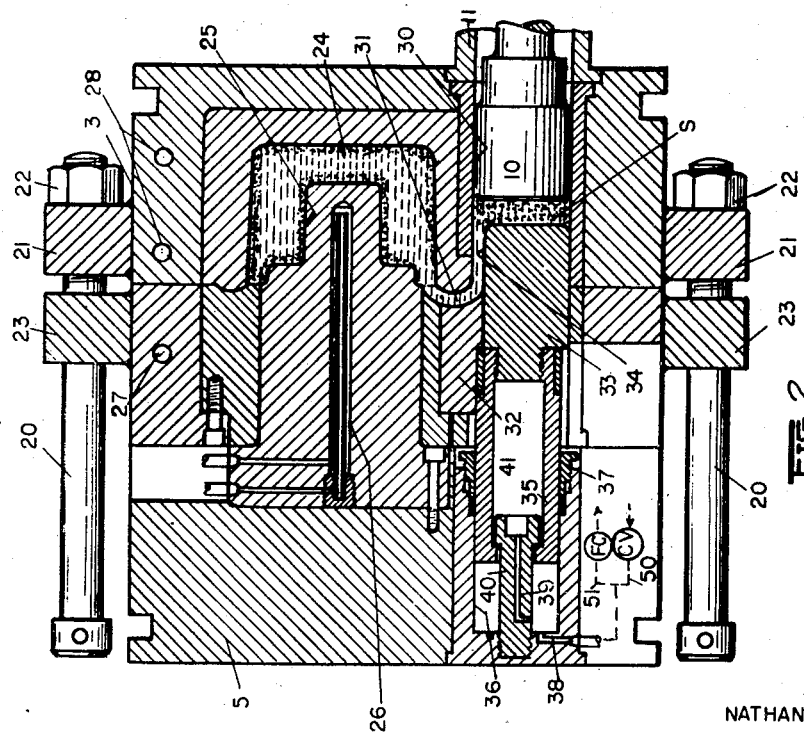

Patented Dec. 3, 1946

2,411,999

UNITED STATES PATENT OFFICE 2,411,999

PRESSURE EXTRUSION MOLDING

Nathan Lester, Cleveland Heights, Ohio, assignor to Lester Engineering Company, Cleveland, Ohio, a corporation of Ohio Application May 19, 1942, Serial No. 443,665

19 Claims. (Cl. 22—68)

The present invention relates to the molding of material wherein such material in the fluid or flowable state is introduced under the influence of pressure into a permanent mold. The molding of molten or quasi-molten materials and of plastic materials in either the fluid or plastic state, previously characterized by such terminology as "die casting" or "injection molding," has been generally described as "pressure casting." One of the major problems confronting workers in the pressure casting art has been the production of castings having a uniform high density throughout and a compact internal structure. Examples of this difficulty are evidenced by the presence in the casting of shrinkage cracks, pin holes, blow holes, segregation, vacuum voids and coarse internal grain structure. Regardless of the amount of pressure applied to the material as it is forced into the mold cavity, such imperfections still persist.

As a molten, fluid or plastic material enters into and fills a permanent mold cavity, it commences to enter the solidified state, not only in the mold itself, but in the gate and in the excess material in the pressure casting chamber. This results in a sudden resistance to further application and compacting of the material in the mold cavity, and at the very time when the introduction of excess material to counterbalance the solidification shrinkage occurring in the casting is most needed.

According to the general object and principle of my present invention, I have solved this problem by providing an apparatus and a method whereby the flow of material at a temperature below its solidification point, as heretofore employed in extruding processes, is combined with the art of pressure casting. Briefly outlined, my invention comprises the filling of the permanent mold cavity with the material to be cast in a molten, fluid or flowable state, and then, as solidification occurs, suddenly increasing the application of pressure upon excess material adjacent the entrance to the mold to such an amount and in such a manner as to cause the excess material to flow into the interior of the mold cavity. This latter flow of excess material into the mold cavity is effected much in the manner in which a quantity of material is extruded through an orifice.

It is a further object of my invention to provide means for automatically increasing many fold, and concentrating upon a relatively small area, the casting pressure which is applied upon the material as it is forced from the pressure casting chamber into the mold cavity.

Another object is not only to eliminate, but to use to advantage the formation of the solidified portion, or "slug," of material in the casting chamber. In brief, my invention contemplates the use of such a casting slug as a momentary and transcendent operating part of the pressure casting mechanism itself.

Additional objects and advantages of the invention shall become apparent during the course of the following description.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is an enlarged, sectional view of the pressure casting chamber and mold cavity, and illustrating the component parts at that point wherein the mold cavity has been filled with material and solidification commences;

Fig. 3 is a view similar to Fig. 2 but showing the parts in position where filling and compacting of the material in the mold cavity is complete;

Figure 1:
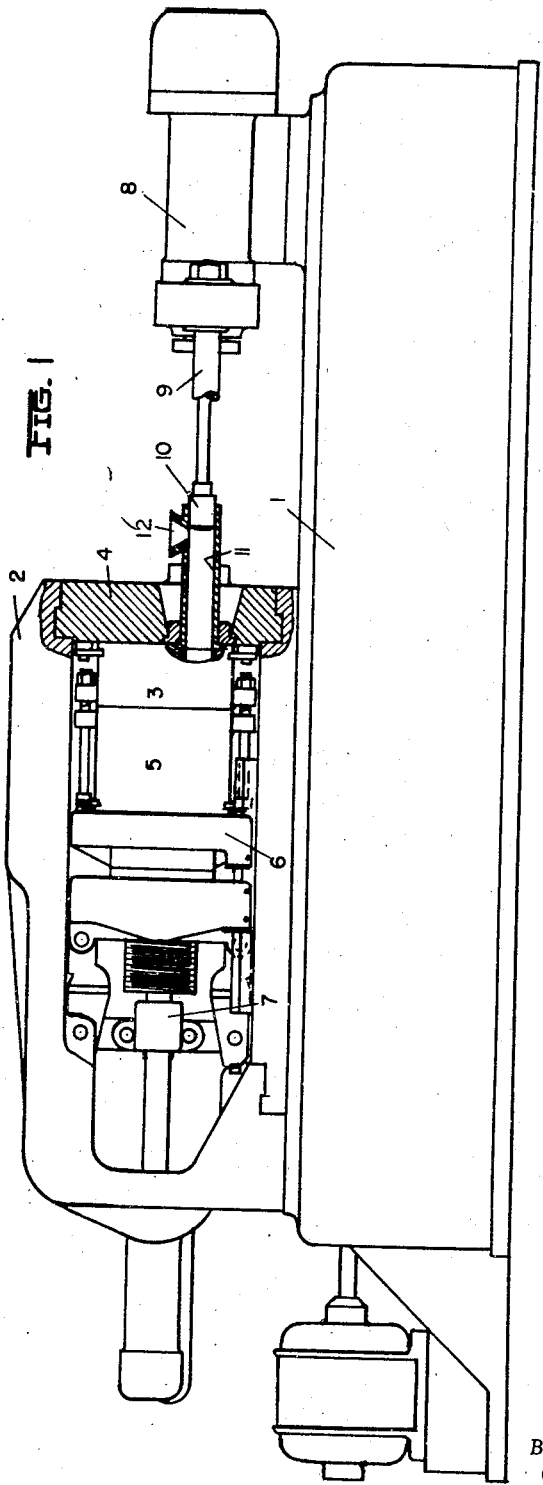
Fig. 1 is an elevational view, partially in section, showing a casting machine constructed according to, and adapted to form the process as embodied in the principle of my invention.

In Fig. 1 there is illustrated a casting machine comprising the base 1 and the upper frame 2 in which the fixed die block 3 is mounted upon the vertical frame member 4 and the movable or ejector die block 5 is carried by the die platen 6, which in turn is moved back and forth into and out of closed die position by means of the hydraulic toggle mechanism indicated generally at 7. On the opposite end of the machine there is located the hydraulic pressure cylinder 8 which is connected by means of the tie rods (one of which is partially shown at 9) to the vertical frame member 4. The casting plunger 10 is connected to the piston rod of the hydraulic cylinder 8 and is adapted to reciprocate in the pressure casting chamber 11. A material feed orifice 12 is provided in the right-hand end of the chamber 11 for the introduction of material which is to be cast.

Now directing attention to Figs. 2 and 3, the die blocks 3 and 5, being shown in such figures in closed position, viz., where their opposed faces are in contact with each other along the "parting line," have reinforcing and guiding bars 20, adjustably attached to the projecting lugs 21 by means of the nuts 22 and slidably passing through the lugs 23 on the ejector die block 25. The mold cavity, which in the present instance is cup-shaped, for the purpose of casting objects such as internal combustion engine pistons, is formed by the recessed portion 24 in the fixed die block 3 and the male or projecting portion 25 on the die block 5. An internal cooling passage 26, comprising a tube mounted concentrically in a surrounding bore, is located in the die block 5 and is connected by the usual ducts and conduits to a cooling medium reservoir. Passages 27 in the die block 5 and passages 28 in the die block 3 are likewise provided for a similar purpose.

Figure 4:
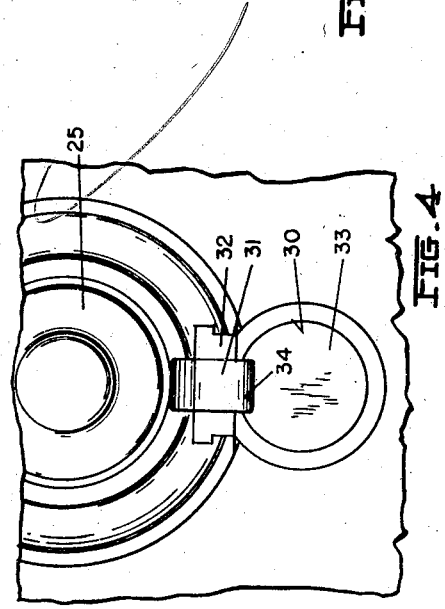
Fig. 4 is a partial elevational view looking at the lower portion of the ejector die block and in a direction from the fixed die block.

The fixed die block 3 includes a hardened metal sleeve or cylinder 30 forming a continuation of the inner wall of the pressure casting chamber 11. A gate 31 leads from the mold cavity to the left-hand or inner end of the casting chamber formed by the sleeve or cylinder 30. A portion of the wall of the gate 31 is formed by the hardened metal insert 32, which as will be seen by reference to Fig. 4 is assembled in the die block 5 by means of a T-joint. The insert 32, providing a portion of the wall surface of the gate 31, is for the purpose of permitting replacement due to frictional wear of the material being forced through the gate, and also to permit different sized insert blocks 32 for varying the cross sectional area of the gate 31 and thus the size of the orifice through which the material must needs be forced into the mold cavity.

A resistance plunger 33 is mounted in the interior of the casting chamber 30 and projects thereinto from the opposite end to that occupied by the pressure plunger 10. A longitudinal channel or groove 34 is provided in the resistance plunger 33 and terminates, at its right-hand end, at the end of such plunger. The block insert 32 has a depending portion which fits into the groove 34.

An annular or sleeve piston 35 is mounted upon the left-hand end of the resistance plunger 33 and fits within the pressure chamber 36, being slidably sealed therein by means of the packing gland indicated at 37. A fluid pressure passage 38 leads to the head or left-hand end of the cylinder 36, and the latter is also placed in communication with the smaller diameter pressure chamber 41 formed in the interior of the sleeve piston 35, by means of the passage 39 extending through the interior of the projection 40 mounted in the head of the cylinder 36.

As indicated by the dotted lines and diagrammatic representations in Fig. 2, the pressure conduit 38 is connected in parallel to the pressure line 50 and the return line 51. A check valve, permitting flow only in a direction entering the passage 38, is located in the pressure line 50, and a flow control valve is mounted in the return line 51.

Thus, as pressure is introduced to the line 50, it will force the resistance plunger 33 in a right-hand position to the position in which it is shown in Fig. 2. Upon reverse travel of the plunger 33, the fluid is forced out of the cylinders 36 and 41, through the passages 38 and 39 and to the line 51. By adjusting the flow control valve in the line 51, the resistance pressure and rate of movement of the resistance plunger 33 in the left-hand direction can thus be controlled. By utilizing the large area cylinder and the relatively small area cylinder 41, a differential rate of movement and of pressures obtainable is made possible. Thus as pressure is introduced from the line 50 into the passage 38 and thence into the small diameter chamber 41, a small volume of fluid will be effective to produce a rapid rate of movement of the plunger 33 in a right-hand direction, and as the latter reaches the end of such stroke, the fluid introduced into both the cylinders 36 and 41 will be operable over a large area to increase the total pressure exerted upon the plunger 33.

The operation of the above-described mechanism is as follows. The material to be cast, such as a molten metal, or a flowable plastic material, is introduced into the feed orifice 12 in a quantity more than that sufficient to fill the mold cavity. The pressure plunger 10 is then moved in a left-hand direction to force the material against the end of the resistance plunger 33, through the channel 34 and the gate 31 into the mold cavity, completely filling the latter. The excess material occupies the gate 31, the channel 34 and the space between the opposed ends of the plungers 10 and 33. At this point the material begins to enter the state of solidification, such solidification normally taking place in those areas or zones which are subject to the greatest rate of heat transfer, viz., around the outer surfaces of the casting or the inner surfaces of the mold cavity. Solidification likewise occurs in the material forming the casting slug S located in the space between the ends of the plungers 10 and 33. At this point the slug S then becomes, in effect, a portion of the plunger 10. Pressure is continued to be applied upon the plunger 10, and when the slug S becomes solidified, all of the pressure exerted upon the plunger 10 is then transmitted and concentrated upon the relatively small cross sectional area of the channel 34. The resistance to movement of the plunger 33 is set at a pre-determined value above the pressure required to flow the material into the mold cavity and to fill the latter; and also above the pressure per unit area required to extrude the material after incipient solidification, through the channel 34 and the gate 31, so that finally the additional amount of material in the channel 34 is forced and compacted into the mold cavity to overcome any shrinkages, blow holes, vacuum voids and the like which have a tendency to occur therein during normal solidification.

As illustrated in Fig. 3, where the parts are shown in their final position of operation, the material is completely and uniformly compacted into the mold cavity. Then, as the die blocks 3 and 5 are retracted, the casting proper (marked C), the material in the gate 31 and the pressure chamber slug S are all drawn away from the fixed die 3 as a unit. If need be, pressure may be continued to be exerted upon the plunger 10, aiding in the forcing of the casting slug S out of the cylinder 30 as the dies are opened. The usual ejector pins (not shown) are then operated to eject the casting C from the die portion 25 and the resistance plunger 33 is then actuated in a right-hand direction to eject the gate slug 8. The dies are then closed to the position as shown in Fig. 2 and the above cycles of operation repeated.

A specific example will serve best to explain clearly the operation of the above-described apparatus and process steps. Such apparatus and method is particularly suited to the fabrication of light metals such as magnesium and its alloys. Difficulty has been encountered in the past in the pressure die casting of magnesium and its alloys due to the primary fact that voids, blow holes and segregation occurred in the interior of the casting, regardless of the pressure exerted in the casting chamber. Thus the density of a pressure die casting of a magnesium alloy denominated as AZ 91 and having the composition of 90% Mg, 9% Al and 1% Zn, has heretofore been found to be 1.801. On the other hand, a magnesium alloy of substantially the same composition, when subjected to an extrusion process, has a density of 1.831. It will thus be seen that there is an increase in density between the pressure die cast and the extruded metal of 1.66%.

The difference in physical properties of the pressure die cast and extruded materials is quite marked. Thus, the pressure die cast magnesium alloy of the density 1.801 has a tensile strength of about 25,000 lbs. per square inch with an elongation of 1%–2%, whereas the extruded magnesium alloy is found to have a tensile strength of above 40,000 lbs. per square inch with an elongation of 10%–20%.

In the operation of my process, I therefore provide for means of so forcing an additional quantity of the material or metal into the mold cavity as to increase the density of the latter up to 2½%. For example, where the volume capacity of the mold cavity is 29 cu. in., I provide a volume capacity of ¾ cu. in. for the channel 34, so it is possible to force and to compact up to 2½% of an additional amount of metal into the mold cavity, over and above that which is originally forced into it.

The forcing, or in effect extruding, of this additional amount of metal into the mold cavity is rendered possible because the pressure per unit area exerted upon the metal in the channel 34 and thence through the gate 31 is sufficiently great to cause a flow of the metal even though the latter is below its solidification point. This again is well explained by a specific example:

With a line pressure of 1,000 lbs. per square inch upon the hydraulic cylinder 8, and a piston diameter of 6 inches, the total pressure exerted upon the pressure plunger 10 will be 28,200 lbs. Assuming the plunger 10 to have a 3 inch diameter, the pressure per unit area exerted upon the material in the casting chamber will then be 4,000 lbs. per square inch. This is, of course, entirely sufficient to cause the metal to flow in the fluid or quasi-fluid, or "mushy" state. However, as the gate slug S becomes solidified, and coincidentally in effect forms a new end on the plunger 10, all of the pressure exerted on the latter is then concentrated upon the relatively small cross sectional area of the channel 34. Thus, where the channel 34 is ½ sq. in. in cross sectional area, the total pressure exerted thereon will be 56,400 lbs. per square inch, quite enough to produce a flow deformation of the metal even where its temperature has dropped well below the solidification point and to as low as 200° C.

Figure 5:
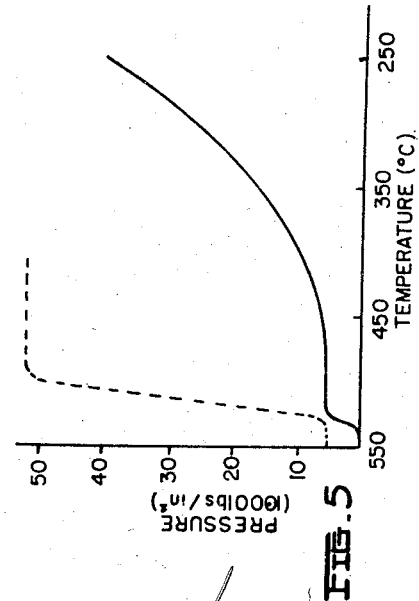
Fig. 5 is a diagram illustrating the relationship of pressure and temperature upon the flow deformation characteristics of an exemplary casting material, viz.: a magnesium alloy.

Fig. 5 further exemplifies the principle of operation of my invention. The solid line curve in Fig. 5 shows the relationship of the amount of pressure required to produce a flow deformation upon a magnesium alloy at varying temperatures. A magnesium-aluminum-zinc alloy was selected, for the purpose of this illustration, having a melting point of about 550° C. Thus, at 550° C. this alloy would flow under gravity because it was in the molten state. However, as it commences to solidify, there is a substantial rise in the solid line curve which levels off for a short distance and then rises quite rapidly as the temperature drops. The rate of deformation upon a test piece of this alloy one inch in diameter and one inch in length was maintained constant, viz., at 4.8 inches per minute, and the solid line curve thus represents the amount of compressive pressure that is required to produce this given flow deformation as the temperature decreases. Now, the dotted line curve in Fig. 5 represents the manner in which the pressure is applied in the above-described mechanism and process of my invention. The sudden rise of the pressure from about 4,000 lbs. per square inch to 56,000 lbs. per square inch occurs just as solidification is taking place in the alloy. Then as the latter loses temperature and would normally become so resistant to flow deformation as to prevent any deformation whatsoever after solidification had occurred in the ordinary pressure casting operation, the pressure automatically applied to the alloy during its solidification and cooling stage is well above that necessary to flow or extrude the additional amount of metal into the mold cavity.

From the foregoing description and exposition, it will be readily concluded that my invention produces a casting free of interior voids, blow holes, pin holes, shrinkage cracks and the like, and that the material of the casting, throughout its cross sectional area is compacted to a uniformly high density, producing the highly desired physical properties of increased tensile strength and toughness.

Other modes of applying the principle of the invention may be employed, change being made as regards the details described, provided the features stated in any of the following claims or the equivalent of such be employed.

I therefore particularly point out and distinctly claim as my invention:

1. The method of casting a flowable material into a permanent mold consisting in the steps of forcing said material under pressure from a pressure chamber of given cross-sectional area through a constricted passageway of relatively smaller cross-sectional area into said mold in an amount sufficient to fill said mold and said passageway, and then, as incipient solidification of said material in said mold occurs, contracting the length of said passageway under the application of relatively greatly increased pressure, thereby forcing an additional amount of material from said passageway into said mold.

2. The permanent mold casting method consisting in the steps of placing a body of molten material in a pressure plunger chamber, ejecting a portion of said material therefrom into the mold to fill the latter, permitting the remaining portion of said material to solidify in said pressure chamber thereby forming a solid layer on the end of the plunger, continuing the ejecting movement of said plunger with said solid layer of material thereon and establishing a second pressure chamber of substantially reduced cross sectional area, and extruding the material from said second chamber into said mold.

3. The permanent mold casting method consisting in the steps of providing dual pressure chambers in communication with each other and in communication with the mold, placing a quantity of molten material in one pressure chamber and then applying pressure thereto to eject said material into the other chamber and into the mold, solidifying said material, and then applying sufficient pressure in said last-named chamber to extrude the material therefrom into said mold.

4. In a pressure casting machine, a mold cavity, a pressure chamber, a passage leading from said chamber to said cavity, pressure means for forcing material from said chamber through said passage and into said cavity, means for reducing the volume capacity of said passage, and means for concentrating the pressure from said pressure means on the material contained in said passage.

5. In a pressure casting machine, a mold cavity, a pressure chamber, an elongated passage leading from said pressure chamber to said cavity, pressure means for forcing material from said chamber through said passage and into said cavity, and a movable member forming a portion of said passage, said movable member having one end located in said pressure chamber and being so arranged and constructed as to be moved by pressure exerted upon the latter.

6. In a pressure casting machine, a mold cavity, a pressure chamber, an elongated passage leading from said pressure chamber to said cavity, pressure means for forcing material from said chamber through said passage and into said cavity, a movable member forming a portion of said passage, said movable member having one end located in said pressure chamber and being so arranged and constructed as to be moved by pressure exerted upon the latter, and means for resisting the movement of said movable member.

7. In a pressure casting machine, a mold cavity, a pressure chamber communicating with said mold cavity by a passageway of contractable length, a pressure plunger movable therein and entering said chamber from its material feed end, a second plunger movable in the opposite end of said chamber and normally spaced from said first plunger, a passage leading from the space between the ends of said plungers to said cavity, a portion of said passage being formed in the outer periphery of said second plunger and a fixed projection on the inner wall of said chamber extending into such last-named portion of said passage.

8. In a pressure casting machine, a mold cavity, a pressure chamber, a pressure plunger movable therein and entering said chamber from its material feed end, a second plunger movable in the opposite end of said chamber and normally spaced from said first plunger, and a passage leading from the space between the ends of said plungers to said cavity, and means for resisting the movement of said second plunger until a predetermined pressure is reached in said chamber.

9. In a pressure casting machine, a mold cavity, a pressure chamber, a pressure plunger movable therein and entering said chamber from its material feed end, a second plunger movable in the opposite end of said chamber and normally spaced from said first plunger, a passage leading from the space between the ends of said plungers to said cavity, a portion of said passage being formed in the outer periphery of said second plunger, and means for resisting the movement of said second plunger until a predetermined pressure is reached in said chamber.

10. In a pressure casting machine, a mold cavity, a pressure cylinder adjacent thereto, opposed plungers mounted in each end of said cylinder, means for applying pressure to move one of said plungers inwardly of said cylinder, and means for applying resistance pressure to the outward movement of the other of said plungers, a gate leading from said cavity to a point in said cylinder normally superposed by said second plunger, and a contractable longitudinal passage formed between the inner wall of said cylinder and the outer wall of said second plunger said passage being of a length extending from such point of entry of said gate to the inner end of said second plunger when the latter is at its innermost position in said cylinder.

11. In a pressure casting machine, a mold cavity, a pressure cylinder adjacent thereto, opposed plungers mounted in each end of said cylinder, means for applying pressure to move one of said plungers inwardly of said cylinder, and means for applying resistance pressure to the outward movement of the other of said plungers, a gate leading from said cavity to a point in said cylinder normally superposed by said second plunger, a contractable longitudinal passage formed between the inner wall of said cylinder and the outer wall of said second plunger said passage being of a length extending from such point of entry of said gate to the inner end of said second plunger when the latter is at its innermost position in said cylinder, and a removable insert forming a portion of the wall of said gate.

12. In a pressure casting machine, a mold cavity, a pressure cylinder adjacent thereto, opposed plungers mounted in each end of said cylinder, means for applying pressure to move one of said plungers inwardly of said cylinder, and means for applying resistance pressure to the outward movement of the other of said plungers, a gate leading from said cavity to a point in said cylinder normally superposed by said second plunger, and a contractable longitudinal passage formed between the inner wall of said cylinder and the outer wall of said second plunger, said passage being of a length extending from such point of entry of said gate to the inner end of said second plunger when the latter is at its innermost position in said cylinder, the volume of said longitudinal passage being equal to about 2½% of the volume of said cavity.

13. In a pressure casting machine, a fixed die block and an ejector die block, a mold cavity formed between the meeting faces of said die blocks, a pressure cylinder formed in and extending from said ejector die block and through said fixed die block, a gate extending from said cavity to said cylinder along the parting line of said die blocks, a pressure plunger reciprocable in said cylinder portion located in said fixed die block, and a resistance plunger reciprocable in said cylinder portion in said ejector die block.

14. In a pressure casting machine, a fixed die block and an ejector die block, a mold cavity formed between the meeting faces of said die blocks, a pressure cylinder formed in and extending from said ejector die block and through said fixed die block, a gate extending from said cavity to said cylinder along the parting line of said die blocks, a pressure plunger reciprocable in said cylinder portion located in said fixed die block, and a resistance plunger reciprocable in said cylinder portion in said ejector die block, a longitudinal groove in said resistance plunger extending from a point in alignment with said gate to the end of such plunger.

15. In a pressure casting machine, a fixed die block and an ejector die block, a mold cavity formed between the meeting faces of said die blocks, a pressure cylinder formed in and extending from said ejector die block and through said fixed die block, a gate extending from said cavity to said cylinder along the parting line of said die blocks, a pressure plunger reciprocable in said cylinder portion located in said fixed die block, a resistance plunger reciprocable in said cylinder portion in said ejector die block, a longitudinal groove in said resistance plunger extending from a point in alignment with said gate to the end of such plunger, and a fluid pressure cylinder in said ejector die block in alignment with said pressure cylinder and adapted to receive one end of said resistance plunger.

16. The method of casting a flowable material into a permanent mold consisting in the steps of applying a predetermined prime moving pressure against a given cross-sectional area of said material under such pressure through a constricted passageway into said mold in an amount sufficient to fill the latter, and then as incipient solidification of said material occurs, suddenly retracting the wall of the passageway to shorten the passageway at the entrance to the mold, thus reducing the cross sectional area of the material subjected to said predetermined pressure, thereby increasing the pressure per unit area on excess material at the entrance to said mold.

17. The method of casting a flowable material into a permanent mold consisting in the steps of applying a predetermined prime moving pressure against a given cross-sectional area of said material under such pressure through a constricted passageway into said mold in an amount sufficient to fill the latter, and then as incipient solidification of said material occurs, suddenly retracting the wall of the passageway to shorten the passageway at the entrance to the mold, thus reducing the cross sectional area of the material subjected to said predetermined pressure, thereby increasing the pressure per unit area on excess material at the entrance to said mold to an amount greater than that required for flow deformation of said material in the solidified state, and thereby forcing such excess material into said mold in addition to the quantity originally filling it.

18. The method of casting a flowable material into a permanent mold consisting in the steps of applying a predetermined prime moving pressure against a given cross-sectional area of said material under such pressure through a constricted passageway into said mold in an amount sufficient to fill the latter, and then as incipient solidification of said material occurs, suddenly retracting the wall of the passageway to shorten the passageway at the entrance to the mold, thus reducing the cross sectional area of the material subjected to said predetermined pressure, thus concentrating such predetermined pressure upon the relatively reduced cross sectional area of the material in said passageway; thereby increasing the pressure per unit area on said material to an amount greater than that required for flow deformation of said material in the solidified state, and thereby forcing such excess material into said mold in addition to the quantity originally filling it.

19. The method of casting a fluid material adapted to become solidified in a permanent mold upon decrease in temperature, consisting in the steps of providing a body of said fluid material, applying a predetermined pressure upon a given area of said body to force it into a passageway leading to said mold, lowering the temperature of said body of material to a point below that of solidification, retracting the wall of the passageway to shorten the passageway at the entrance to the mold, thus concentrating said predetermined pressure upon a relatively reduced area of said material, and simultaneously increasing the application of pressure per unit area thereon to an amount greater than that required for flow deformation of said material at such decreased temperature, thereby forcing an additional amount of material into said mold.

NATHAN LESTER.